United States Patent [19]

Davidson

[11] Patent Number: 4,474,114
[45] Date of Patent: Oct. 2, 1984

[54] ARRANGEMENT FOR CONVEYORS

[76] Inventor: Mats I. Davidson, Djupadal, 502 78 GÅnghester, Sweden

[21] Appl. No.: 380,661

[22] PCT Filed: Sep. 17, 1981

[86] PCT No.: PCT/SE81/00267
§ 371 Date: May 7, 1982
§ 102(e) Date: May 7, 1982

[87] PCT Pub. No.: WO82/00991
PCT Pub. Date: Apr. 1, 1982

[30] Foreign Application Priority Data

Sep. 17, 1980 [SE] Sweden ............................. 8006510

[51] Int. Cl.³ ............................................. B61B 13/12
[52] U.S. Cl. ................................... 164/162; 104/109;
104/250; 198/744; 198/746
[58] Field of Search ........................ 104/96, 106–109,
104/155, 162, 249, 250, 252; 198/744, 746;
92/88

[56] References Cited

U.S. PATENT DOCUMENTS 1,730,519 10/1929 McKee ........................... 104/108 X
2,606,504 8/1952 Stamler .............................. 104/162
3,407,750 10/1968 Rantz .................................. 104/162
3,454,242 7/1969 Feder et al. ........................ 92/88 X
4,248,563 2/1981 Fur ................................. 198/744 X

FOREIGN PATENT DOCUMENTS 508163 9/1930 Fed. Rep. of Germany ...... 104/252
885905 1/1962 United Kingdom ................ 104/252

Primary Examiner—Randolph Reese

[57] ABSTRACT

A conveyor for moving a number of goods carriers (22) along a track has a drive device provided with a driver member (59) operating with a reciprocating movement which can entrain the goods carriers in the desired transport direction and move freely in the return direction. The track consists of a hollow profile (1) with a groove (11) which in the longitudinal direction of the track firstly has fully closed sections and secondly is provided with sections having a side aperture (62). Plugs (26, 32) are inserted in the fully closed sections and between the plugs cylindrical spaces (40) are formed which enclose a piston (36) with a piston rod (38) which extends beyond the cylindrical space. In the open sections members (24) which can move along the groove are provided, these members being combined with piston rod (38) and provided with the carrier devices (59) which are accessible through the side aperture (62). A track for the goods carriers (22) is provided on the outside of the girder and the carrier devices (59) can make contact with the goods carriers through the aperture (62). The cylinder chamber (40) is connected to pipelines for a pressure medium so that the piston (36) or pistons can be moved backwards and forwards as a result of the introduction of pressure medium on different sides of the piston. The drive device (59) thus moves the goods carrier (22) in the desired transport direction.

6 Claims, 5 Drawing Figures

ARRANGEMENT FOR CONVEYORS

BACKGROUND

For certain transport requirements a type of intermittently-operating conveyor is available in which a feed device with reciprocating motion feeds forward supporting devices for goods of one type or other. This type of conveyor device has advantages in comparison with the other type of conveyor generally employed which has a continuously-moving drive element and is particularly suitable on the one hand where the path along which the material is to be transported is extremely long and can at the same time be provided with a certain slope, at least over significant distances, and secondly where extensively branched paths with many side lines are involved. In the first case the reciprocating drive devices can be employed on restricted distances where ascending gradients are involved or where the speed needs to be regulated while along the remaining sections the material supporting devices can move by means of gravity. In the latter case it may be difficult to arrange for continuously moving drive elements, because the drive of such elements can become particularly complicated in the event of several side paths. At the same time complicated transfer arrangements are often required at the branching points for the material. Hence conveyors of the said type are advantageous and are difficult to replace by other types for certain applications.

Technical problem

However they do generally have disadvantages. The reciprocating drive devices have to be connected to special drive means which have to be arranged along the path at the requisite locations. These drive means are often complicated and bulky and take the form of special units adjacent to the conveyor track which require special stands and fixing devices.

The Solution

In the invention the track consists of a girder with the shape of a hollow profile having a groove which in the lengthwise direction of the track firstly has one or more portions with completely closed cross-section and secondly one or more sections provided with a side aperture, whereby in the closed portion or portions plugs are inserted, between which one or more cylindrical spaces are formed, each arranged so as to enclose a piston with piston rod. The latter extends outside the cylindrical space. In the open portions, extending lengthwise along the groove, extended preferably flexible members are arranged which are joined to the piston rods, provided with the said driver members which are accessible through the said side apertures. On the outside of the girder a track is arranged for material carriers adjacent to the said side aperture, so that the driver members can make contact with the material carriers through the aperture. The cylindrical chamber is connected to pipelines for a pressure medium, so that the piston or pistons can be displaced back and forth as a result of the pressure medium being introduced on different sides of the piston. The members are driven by the piston rod so that the driver devices move the material carriers in the intended transport direction.

Advantages

The object of the present invention is, in the case of conveyors of the said type with reciprocating drive device, to bring about drive arrangements in the path of the material supporting devices which facilitates a simpler and less bulky design and greater ease of erection.

Another object of the invention is to bring about a drive device of the specified type which is extremely versatile, in use not only for the propulsion of material supporting devices, but also for other functions.

BRIEF DESCRIPTION OF DRAWINGS

The attached drawings illustrate an embodiment of the invention, whereby reference should be made to the drawings in the following specification. On the drawings

FIG. 3 provides a longitudinal section through the drive device, while;

BEST MODE OF CARRYING OUT THE INVENTION

Figure 1:
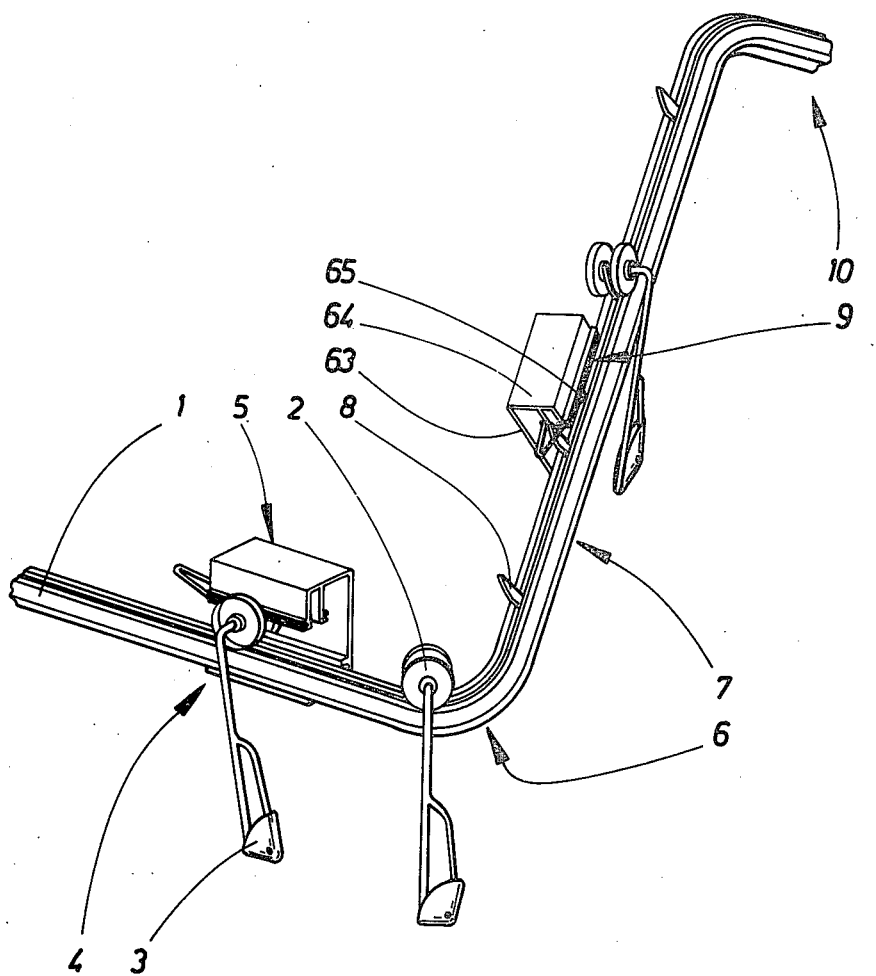
FIG. 1 shows, in perspective view, a section of a conveyor track to which the invention is applied.

FIG. 1 illustrates a section of a conveyor track. The diagram shows a girder 1, which forms a roller track for a number of carriages 2 which are designed to carry material hanging therefrom by means of hooks 3. The girder 1 is supported by a frame, which is not shown. Over an initial section 4 of the path the latter slopes in the direction of transportation, so that the carriages roll forward under their own weight. Along the section 4 a feed detent 5 is inserted which is arranged so that under the influence of drive devices it will feed forward the carriages in the desired sequence. By this means they arrive at a lowest point 6 along the path where it is assumed that there is a delay station for the material. This lowest point 6 is followed by an inclination 7 in the track along which the carriages have to be fed by means of a drive device 8 (merely hinted at in the diagram). A detent device 9 forms part of the drive arrangement 8. After the ascending portion 7 of the track formed by the girder 1 there is a section 10 which once again slopes downward in the direction of transportation.

Figure 2:
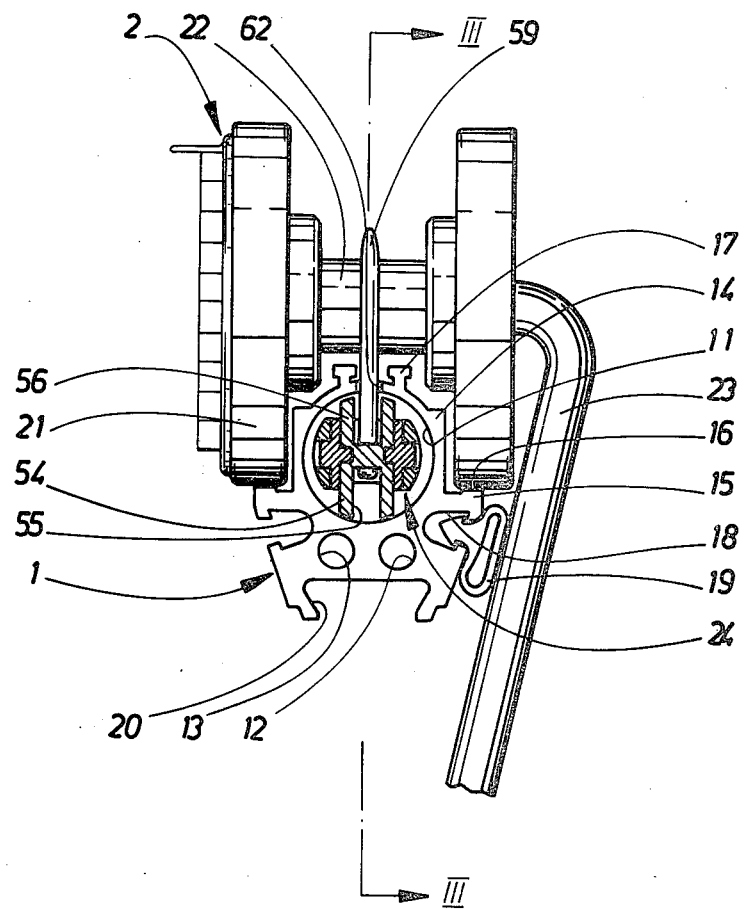
FIG. 2 illustrates a cross section through the drive device in accordance with the invention.

FIG. 2 illustrates the girder 1 in cross section. As can be seen from the diagram the girder is tubular in shape with a groove 11 of large diameter and two holes or apertures 12 and 13 of smaller diameter. The upper portion of the girder which encloses the groove 11 has two parallel side surfaces 14, which are terminated at the bottom by flanges 15 with upper surfaces 16. At the top the girder is terminated by short flanges 17 which, as will be explained later, can function as guides for the feeding device. Under the flanges 15 there are grooves 18 on both sides which, as shown on one side can be employed for supporting a protective border 19. Underneath, the girder has a dovetail-like groove 20 which is provided for attachment and support of the girder, this being joined to a frame by means of clamping devices which engage in the groove 20.

The cross section described comprises a section of the girder which is central to the invention. However the girder need not consist solely of this portion, but can for different applications possess further sections, used for example for attaching adjacent devices or for types of suspension other than those specified in which the groove 20 forms a part.

As shown in FIG. 2, the upper surfaces 16 of the flanges 15 are designed to support wheels 21 on the carriages 2 previously mentioned. The side surfaces 14 serve to guide the wheels 21. The wheels are joined by means of a shaft 22 from which, on one side, an arm 23 projects, which terminates at the bottom by the hook 3 previously mentioned (not shown in FIG. 2). As indicated previously by FIG. 2, the groove 11 is employed as a mounting for a reciprocating drive chain 24, which like other devices mounted in the groove 11 will be described subsequently.

Figure 3:
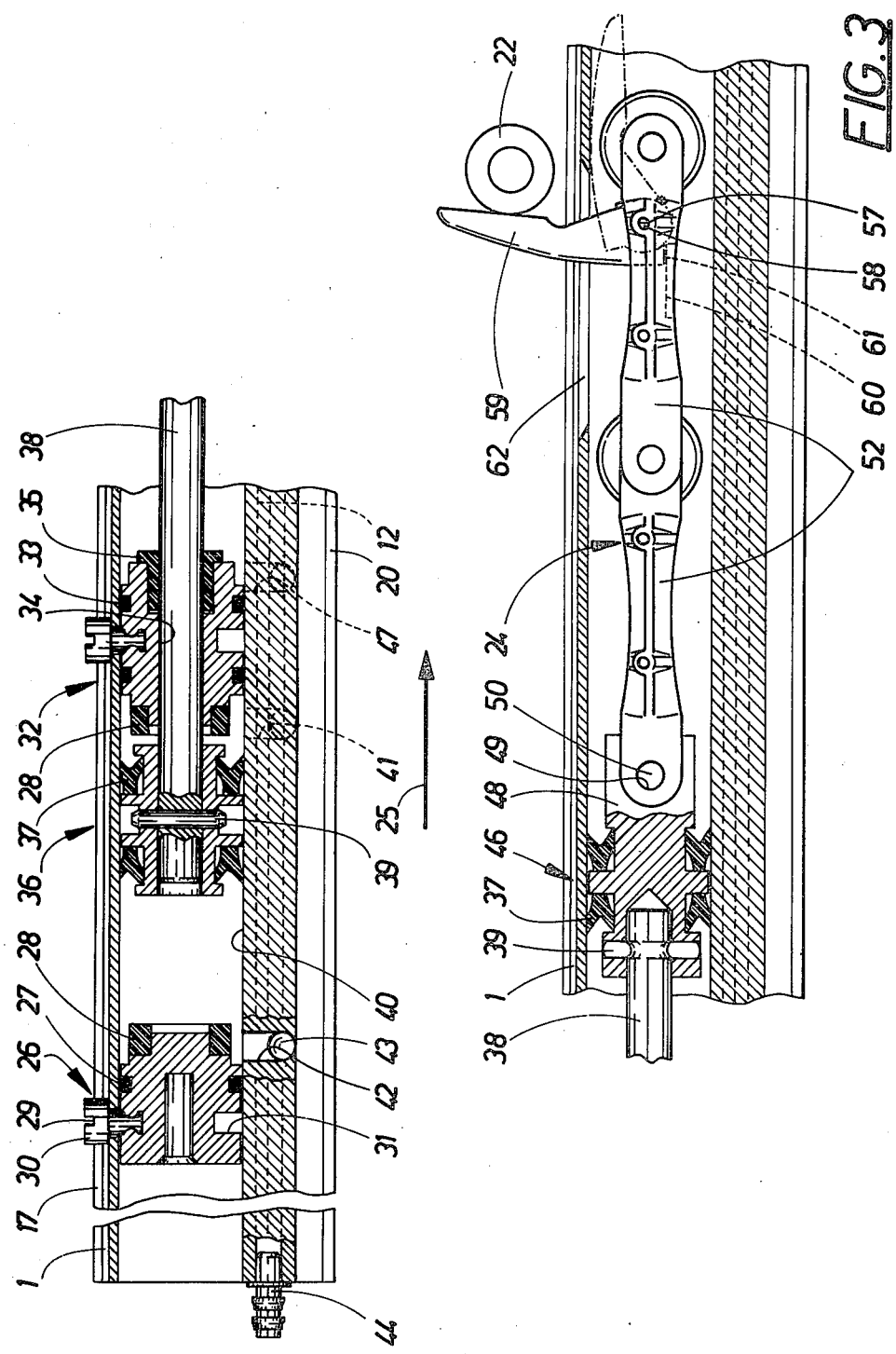

FIG. 3 shows a longitudinal section through the girder adjacent to the ascending section 7 in accordance with FIG. 1. The direction of transportation of the carriages 2 along the ascending section is indicated by an arrow 25 in FIG. 3.

In FIG. 3 we see once more several of the sections of the girder 1 described previously, including the groove 11 and the aperture 12. In FIG. 3 the girder is divided into two sections, for reasons of space, the lower section being intended to follow on to the right after the upper section. A plug 26 in the form of a cylindrical body with a O-ring 27 inserted in a groove is provided to the extreme left in the first section of the girder, represented by the upper section, and on one side there is a buffer ring 28. The plug 26 is secured at the desired location in the groove 11 by virtue of the fact that a hole is drilled through the base of the groove between the flanges 17, an oval pin 30 provided with a screwdriver slot being introduced through the said hole, whereby in one rotational position the pin can be freely introduced into a groove 31 on the plug 26, while in another rotational position it presses against the sides of the groove and is thus held firmly. At some distance from the plug 26 there is a second plug 32 which is held in position in the same way by means of an oval pin 30. The plug 32 has two O-rings 33 together with a buffer ring 28 in roughly the same manner as plug 26. As distinct from plug 26 however plug 32 is traversed by a groove 34 with a sealing bush 35. The plugs 26 and 32 have buffer rings 28 which face each other and in the space between them a piston 36 is inserted provided with two retaining rings 37 and fastened to a piston rod 38 by means of a pin 39. The piston rod 38 extends through the groove 34 and is sealed against the sealing bush 35. The piston 36 is designed to move backwards and forwards in the cylindrical space 40 formed by the groove 11 between plugs 26 and 32. In order to bring about movement of the piston a pressure medium must be fed into the cylindrical space alternately on either side of the piston. The holes 12 and 13 are employed for this purpose, whereby one of the holes is connected by means of a drilled transverse hole 41 with one end adjacent to the plug 32 of the cylindrical space while the second hole is joined by means of a second transverse drilled hole 42 with the other end of the cylindrical space at plug 26. Since the holes have to be drilled from outside, this results in an outlet to the outside of the girder which has to be sealed. As shown in FIG. 3, this is done by pressing balls 43 into the outer ends of the holes 41 and 42. The pressure medium, preferably compressed air, can be supplied to the holes 12 through hose nipples 44. The end of the hole 12 has to be sealed at the end of the beam, and this can similarly be done by pressing in balls (not shown).

FIG. 3 illustrates two cylindrical spaces. There is actually nothing to prevent several pistons being provided along the piston rod 38 and these can be located between plugs of the same type as plug 32. These cylindrical spaces are connected in the same way as cylindrical space 40 by means of drilled holes 41 and 42 which resemble the transverse drilled holes. By this means the piston force which is restricted by the limited dimensions of the girder and the desire to restrict the internal pressure therein should it be decided to design this as extruded profile in aluminium or plastic, can be doubled or multiplied even further. In this connection it is not essential to design all pistons so that they exercise force in both directions. With the arrangements shown here the conveyor work takes place only in one direction (see arrow 25), while the movement in the other direction is a return stroke, which requires a negligible amount of force.

Having regard to the above-mentioned conditions in the present embodiment the force in the direction of transport has been doubled by providing the piston rod 38 at its end (see the lower section in FIG. 3) with a second piston 46 having sealing rings 37. Here too the piston rod is attached by means of a pin 39. Here too there is a transverse drilled hole 47 which is linked with the same hole 12 from which the transverse drilled hole 42 originates.

The cylindrical space or spaces which are formed in the groove 40 form together with the piston 36 and 46, and possibly with further pistons, a pneumatic force device. Alternatively the force device can be hydraulic, but here it is assumed that the drive takes place by means of compressed air. The member which moves the force device is the piston rod 38. This must be connected to a drive device and in the following a description is given of a forward-drive device for the carriages 3. For this purpose the piston rod 38 is provided with a head 48 which forms a part of the piston 46. Through this there is a hole 49 to which the chain 24 shown in cross section in FIG. 2 is connected by means of a pin 50. The chain consists of links 52 which are fork-shaped at their ends. The fork-shaped end of the first link surrounds the said head 48 and is joined with this by means of the pin 50. The second link 52 in the chain surrounds the fork-shaped outer end of the first link 52, after which the remaining links follow in the same manner in sequence. This description should indicate that one fork-shaped end of the link is wider than the other. In each link, inside the narrower fork-shaped link a wheel 54 (see also FIG. 2) with a center groove 55 and slide ways 56 is provided, which wheel 54 can be inscribed in a circle having a diameter somewhat less than that of the groove 40. Thus the chain with its wheel 54 can be carried in the groove 40. The outer link ends and the wheels 54, each of which thus possess two roller paths 56, are mounted on the inner link end which is provided with studs which extend outwards and through the holes in the outer link and inwards through the holes in the wheel 54.

The links 52 are all mutually identical in the embodiment illustrated and they also contain holes 57. Detent arms 59, which by means of a surface 60 can rest against a center portion 61 of the respective links which forms a bridge between the link sides are mounted in the links by means of pins 58. Thus the detent arm 59 cannot be moved backwards (anti-clockwise in FIG. 3) beyond its raised position in which the arm tries to maintain itself against the action of a torsion spring, not shown. On the other hand the detent arm can be moved forwards inside the outermost portions of the link, i.e. the slide paths 56. This means the detent arm comes to rest in the grooves 55 of the nearest roller. Not every link is provided with a detent arm, these being located at a certain distance, as will be indicated by the following description. The detent arms can extend outwards from the groove 40 thanks to the provision of a groove 62 between the flanges 17 (see FIG. 2) at the center of the location where they should make contact.

The chain described is designed to feed the carriages 3 along the ascending portion 7 of the girder 1 by means of its detent arms. Hence for this purpose the detent arms of the chain move to and fro so that they can feed the carriages in sequence up the incline with the detent arms in the unfolded position, while during the return stroke the detent arms can swing inwards against the action of the said spring so that they can pass at the rear of the carriages for a new working stroke. However to ensure that the carriages are not participating in the return movement, the detent device 9 mentioned in conjunction with FIG. 1 is provided. This consists of a U-shaped girder 63 (FIG. 1) which is attached in the grooves 20 on girder 1 and is thus supported by the latter. The upper flange 64 of girder 63 carries a hinge-mounted detent hook 65 which is mounted on a trunnion and which is spring-loaded so that it can fold downwards, giving way to the carriages when these pass in the feed direction, but which drops out at the rear of the carriages and prevents a return movement past the detent hook. Hence the detent device 9 is self-acting as a result of the pressure exerted by the carriages during their forward feed.

Thus the force device which is formed by the components described which are inserted in the tubular-shaped girder 1 is used for the forward transport of the material on the girder which is designed as a roller track. However force devices designed in a similar manner which are integrated with the girder 1 can be employed for functions other than direct forward transport, such as different control functions. As an example of such an application of a force device integrated with a girder, a description will be given in the following of the step forward feed detent device denoted by 5 in FIG. 1. The object of this is to feed the carriages forward stepwise one at a time in a pre-determined time sequence regardless of whether the forward feed along the sloping portion 4 of the track occurs in a different sequence. Hence the carriages can form a queue in front of the step forward feed detent 5 and from this be released one by one to the lowest point 6 of the track where it is assumed that there is a delay station for the material.

Figure 4:
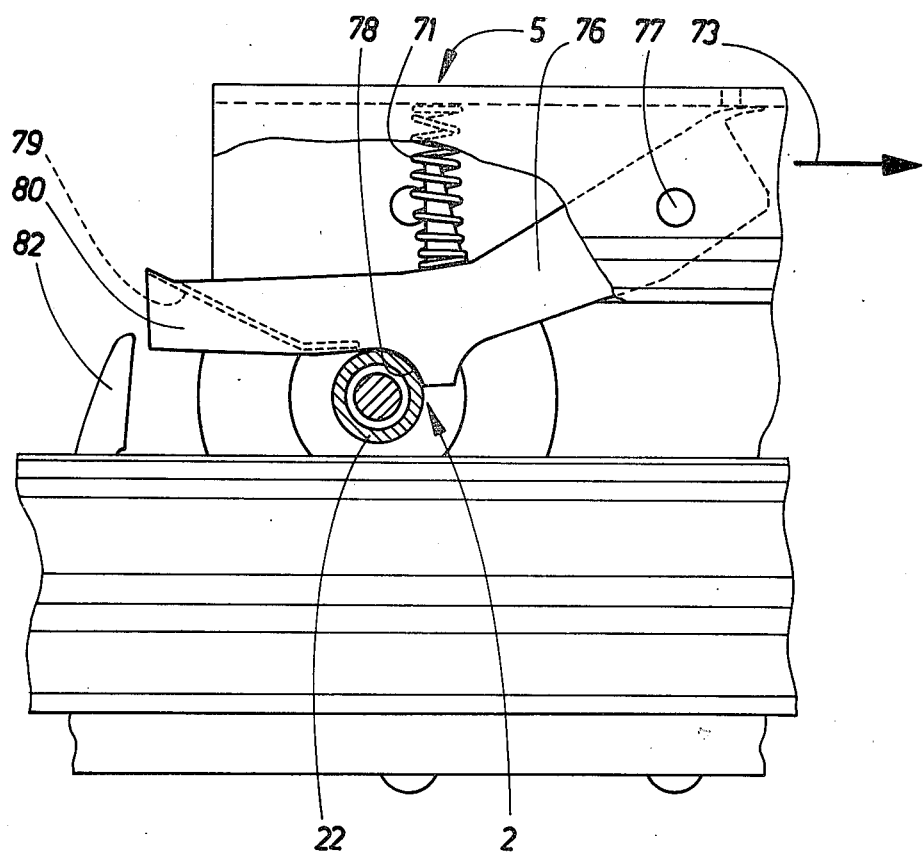
FIG. 4 and 5 illustrate a driven device.
Figure 5:
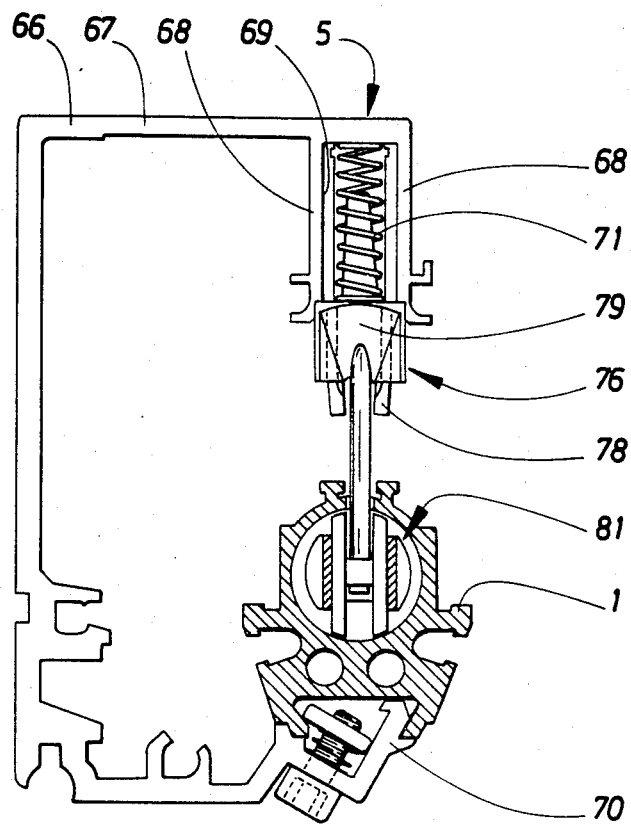

As shown in FIGS. 4 and 5 a frame for the step forward feed detent is formed by a U-shaped girder 66 of the same type as the said girder 63. As shown in FIG. 5 two edge flanges 68 which form between them a groove 69 proceed downwards from its upper flange 67. The lower flange 70 of the girder is fastened at the groove 20 to the previously-mentioned girder 1 which contains the force devices and which comprises the track for the carriages 2. A spring-loaded detent hook 76 which can pivot around a shaft 77 and which attempts to adopt the lower position illustrated in FIG. 4 under the action of a spring 71 is mounted in the groove 69. From this position the detent hook 76 can be folded upwards to an upper position. In the lower position the detent hook 76 rests against the shaft 22 of a carriage 2 which is moving along the girder 1. The detent hook 76 has a stop surface 78 which is so steep that the axle 22 of the carriage is not able to lift the detent hook against the action of spring 70 which attempts to swing it downwards to the stop position illustrated in FIG. 4. As shown in FIG. 4 the detent hook 76, in front of the stop surface 78, has a gently sloping surface 79 which however can never be reached by the axle because it is surrounded by downward-projecting flanges 80.

As shown furthermore by the diagrams, in the center of the step forward feed device 5 a chain 81 of the type previously described is inserted which by means of a forward feed arm 82 can swing forward in the direction of feed as previously described. The chain can be fed forward and backwards by means of a force device of the type already described. This force device can be separate if it is desired to control the stepwise forward feed by means of the detent, regardless of the forward feed along the ascending portion 7 of the track. However since the same number of carriages generally has to be transported away from the delay station 6 as is fed step-wise to the latter, a single force device can often be employed for both functions to feed the carriages forward step-wise through the step forward feed detent and to feed them up along the ascending portion 7. For this purpose an extended chain proceeds from the force device and is provided with forward feed arms both at the forward feed detent 5 and the ascending section.

The said step forward feed arm 82 has such an area of movement that it moves in under the surface 79 of the detent 76. Since the arm is of such a length that it can just move in under the upper initial portion of the surface 79, during the continued feed in the feed direction of the arm the latter lifts the detent hook 76 for movement clockwise, as shown in FIG. 4. As a result the stop surface 78 is moved about the axle 22 and as a result of the slope of the track, the carriage passes the detent hook 76. The carriage can pass the arm 82 on its path up to the step forward feed device because the carriage is able to fold the arm forward (but not backwards) as previously described in conjunction with the arm 59.

During operation of the conveyor it is assumed that the track, i.e. girder 1 with the downward sloping section 4, is connected to a feed-in point for the carriages 2. As mentioned in the introduction, such a feed-in point can be a branching switch from a main conveyor track. Alternatively it can for example be an in feed point from a store room or other supply arrangement. Since the section 4 of the track slopes downwards the carriages 2 will roll until they meet the detent device 5. In the latter the first carriage which reaches the detent device will be attached to the detent hook 76. If further carriages arrive along the track before the carriage resting against the detent hook has been moved, these will form a line at the rear of the first-mentioned carriage.

The intention is that the carriages will be fed one at a time when the desired time interval has elapsed and a pressure medium is supplied, through a valve which is controlled in a suitable manner e.g. manually controlled, through the nipples 44 to the hole 12 and further through the transverse holes 42 and 47 and thus to the rear of pistons 36 and 46. At the same time the space in front of the piston 35 is connected to a vent position by way of the hole 41 and the longitudinal hole 13. The piston 46 has already been vented on its front face as a result of the connection with aperture 62. This circumstance results in the pistons and thus the piston rod 38 moving in the feed direction (arrow 25 in FIG. 3). The chain 24 and thus also the detent arms 82 (denoted in FIG. 3 by 59) participate in this movement. During this the detent arm 82 is led underneath the surface 79 of the detent hook 76 and lifts the detent hook so that the axle 22 of the carriage can pass by the surface 78. The carriage proceeds out of the detent device 5 as a result of the slope of the track and reaches the lowest point 6.

In the embodiment illustrated the chain 24 continues past the lowest point 26 and into the ascending portion 7. Along this section the chain exhibits detent arms 59 (designated as the drive device 8 in FIG. 1). During their forward movement, since they cannot be tilted backwards as a result of the surface 61 being supported against the transverse portion 60, these detent arms can entrain the trolley which has been advanced past the detent hook 65 in the detent device 64 which prevents reverse feed. During their backward passage however the detent arms can deflect downwards to the position shown by the dash-dotted lines in FIG. 3. Thus the carriage which is held against the detent hook 65 cannot move downwards along track section 7. During the next movement of the chain 24 and thus of the detent arms 59 the carriage can consequently be moved upwards once again. In this way the carriages can be advanced by means of the detent arms 59 on chain 24 up along section 7 by means of the drive from the said cylinder arrangement in girder 1. Dependent upon the stroke length, arrangement of the detent devices, the number of detent arms and the length of the ascending section, the carriages can be moved up along this by means of one or more repeated strokes of the cylinder device to reach the section 10 which once more slopes downwards. From this the carriages roll under their own weight to a discharge pipe, another delay station or another reception point for the carriages.

A considerable advantage of the invention is that at least the major portion of the track can be arranged in the form of a uniform parallel girder. By making slight changes to it along its length it can be fitted out as a pneumatic or possibly hydraulic drive device, as control device for the drivers for the material support devices, or as device for controlling anciliary equipment such as step detents and the like along the track. In accordance with the embodiment the girder is at the same time designed as roller track for carrying devices for goods and furthermore comprises a fixing point for additional equipment such as detent devices. The girder, which is preferably manufactured in the form of an extruded profile, thus performs a large number of functional requirements in a single continuous configuration. However it is within the concept of the invention that the track can as a whole be made up also of track sections made up in a different manner. For example on a long track adjacent sections containing drive equipment and additional equipment can be designed in the manner described above, while other sections comprising transport sections without drive equipment can be designed in a different manner.

I claim:

1. In a conveyor: a track for supporting a plurality of carriers for movement along the track, and a drive device for moving the carriers along at least certain sections of the track, said drive device having carrier devices mounted for reciprocating movement along the track, and arranged for driving at least one of said carriers in one direction, the transport direction, and for moving freely in another direction opposite said one direction, the return direction; at least a portion of the track comprising a girder having a hollow profile with a groove extending in the direction of the track and having at least one section with a completely closed cross section, and at least one open section provided with a side aperture, plugs being inserted in said at least one completely closed section, at least one cylindrical space formed between said plugs, each space being arranged to enclose a piston with a piston rod which extends outside the cylindrical space; in said at least one open section there being provided elongated devices capable of movement in the lengthwise direction of the groove and joined with said piston rod and provided with the said carrier devices which are accessible through said side aperture, on the outside of the girder a track being arranged for the carriers adjacent to said side aperture so that the carrier devices can make contact with the carriers through said aperture, each cylindrical space being connected to pipe lines for a pressure medium so that the piston can be moved backwards and forwards upon introduction of the pressure medium on different sides thereof, the elongated device being entrained by said piston rod so that the carrier device moves the carriers in the desired transport direction.

2. The combination according to claim 1, wherein said girder has at least two longitudinal holes which are arranged to connect with the groove inside said cylinder space and with said source for the pressure medium, whereby said holes function as said pipe lines.

3. The combination according to claim 1, wherein said elongated device is arranged for driving and controlling ancillary equipment for the track.

4. The combination according to claim 1, wherein a plurality of pistons are connected to the same piston rod in order to multiply the force controlled by the cross section of the piston.

5. The combination of claim 1, 2, 3 or 4, wherein said elongated device is a chain having links provided with roller devices arranged to run in the groove and on which at least certain links are arranged so as to support said carrier devices.

6. The combination according to claim 5, wherein the carrier device is a detent arm which extends from the chain out through the aperture and which in the one direction is locked in a projecting position, and which is arranged to deflect inwards in the other direction.

* * * * *